Figure 1:
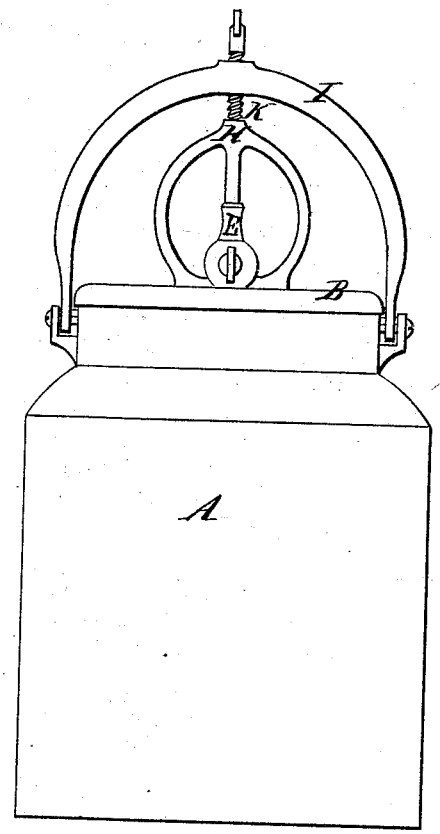

J. H. LESTER.
MILK-CAN.

No. 170,094.

2 Sheets—Sheet 1.

Patented Nov. 16, 1875.

Witnesses
S. J. Gordon
John W. Ripley

Inventor
John Henry Lester

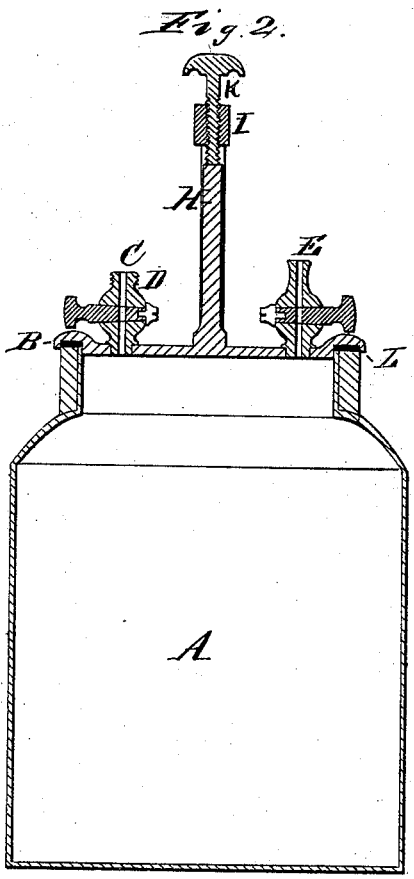

UNITED STATES PATENT OFFICE.

JOHN H. LESTER, OF NEW YORK, N. Y.

IMPROVEMENT IN MILK-CANS.

Specification forming part of Letters Patent No. 170,094, dated November 16, 1875; application filed October 26, 1875.

*To all whom it may concern:*

Be it known that I, JOHN HENRY LESTER, of the city, county, and State of New York, have invented a new and Improved Milk-Can; and I do declare hereby that the following is a full, clear, and exact description thereof, reference being had to the accompanying drawings making a part of this specification, and the letters of reference marked thereon, in which the same letter represents the same thing in each figure.

Figure 1 is a side elevation of my improved can; Fig. 2, a cut section thereof.

A represents the body of the can; B, the lid; C, the injecting-faucet; D, the screw-thread thereof; E, the air-escape faucet; H, the lid-handle; I, the bail; K, the screw to secure the lid; L, the gasket.

The object of my invention is to provide a can in which milk may be transported long distances in warm weather without injury, either by churning or souring, as has been the case heretofore in ordinary cans.

I accomplish the desired result by so compressing the milk within the can that its particles will be practically motionless as units when the entire body is moved.

The operation is as follows: The can being filled with milk, connection is made by screw D on open faucet C with a pipe leading to a force-pump. Screw K in bail I is turned tightly upon lid-handle H, which forces gasket L upon the bottom of lid B tightly upon the neck of can A. Faucet E is then opened and the milk pumped into the can until it streams forcibly out of faucet E, when it is closed, and as much more milk forced in as possible, when faucet C is closed and the pump disconnected.

What I claim as my invention, and desire to secure by Letters Patent, is—

The combination of the can A, lid B, provided with the gasket, bail I, screw K, and faucets C and E, forming a vessel for the transportation of milk under pressure, substantially as described.

JOHN HENRY LESTER.

Witnesses:
 S. J. GORDON,
 JOHN W. RIPLEY.